United States Patent
Faulhaber et al.

(10) Patent No.: US 10,338,213 B1
(45) Date of Patent: Jul. 2, 2019

(54) AUTO TIER II

(71) Applicant: NORTHROP GRUMMAN SYSTEMS CORPORATION, Falls Church, VA (US)

(72) Inventors: Martin T. Faulhaber, Melbourne, FL (US); Robert A. Scow, Rancho Palos Verdes, CA (US); Richard Warren, Satellite Beach, FL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 408 days.

(21) Appl. No.: 15/423,113

(22) Filed: Feb. 2, 2017

(51) Int. Cl.
| | |
|---|---|
| *G01S 13/88* | (2006.01) |
| *G01S 13/86* | (2006.01) |
| *G01M 5/00* | (2006.01) |
| *G01S 7/40* | (2006.01) |
| *G01S 13/89* | (2006.01) |
| *G01S 7/00* | (2006.01) |
| *G01S 13/00* | (2006.01) |

(52) U.S. Cl.
CPC ......... *G01S 13/881* (2013.01); *G01M 5/0033* (2013.01); *G01S 7/40* (2013.01); *G01S 13/867* (2013.01); *G01S 13/89* (2013.01)

(58) Field of Classification Search
CPC .............................. F41H 11/12; H01Q 3/267
See application file for complete search history.

(56) References Cited

U.S. PATENT DOCUMENTS

| | | | | |
|---|---|---|---|---|
| 3,842,418 A | * | 10/1974 | Lorber | G01S 7/411 342/192 |
| 6,031,486 A | * | 2/2000 | Anderson | B64G 7/00 342/165 |
| 6,529,157 B1 | * | 3/2003 | Mensa | G01S 7/412 342/173 |

(Continued)

FOREIGN PATENT DOCUMENTS

GB 2252217 A * 7/1992 ........... G01S 7/4004

OTHER PUBLICATIONS

A. Martinez Picar et al., "Antenna Pattern Calibration of Radio Telescopes using an UAV-based device"; IEEE publication 978-1-4799-7806-9/15/$31.00; copyright in the year 2015; published by IEEE, Piscataway, New Jersey, USA. (Year: 2015).*

*Primary Examiner* — Bernarr E Gregory
(74) *Attorney, Agent, or Firm* — John A. Miller; Shumaker, Loop & Kendrick, LLP

(57) ABSTRACT

A system for providing an estimate of far-field radar cross-section (RCS) measurements of an aircraft. The system includes a plurality of automatic guided vehicles (AGV) each including a robot arm and a radar unit selectively mounted thereto and being interchangeable with a camera. Each AGV includes an AGV controller for controlling the robot arm, the radar unit and the camera so as to cause the radar unit to provide the near-field RCS measurements or the camera to provide images of the aircraft. The system further includes a real time signature diagnostic sub-system (SDS-RT) responsive to the near-field RCS measurement signals from the radar units and the images from the cameras in real (Continued)

time, and an SDS controller responsive to re-configured near-field RCS measurement signals and images from the SDS-RT and configuring the near-field RCS measurement signals and the images into the estimate of the far-field RCS measurements of the aircraft.

20 Claims, 2 Drawing Sheets

(56) References Cited

U.S. PATENT DOCUMENTS

| | | | | |
|---|---|---|---|---|
| 6,570,539 | B1* | 5/2003 | Snow | G01R 29/10 342/165 |
| 7,592,947 | B1* | 9/2009 | Lee | G01S 7/412 342/159 |
| 7,750,842 | B2* | 7/2010 | Lee | G01S 7/4021 342/169 |
| 8,077,098 | B2* | 12/2011 | Snow | G01R 29/10 342/169 |
| 8,098,194 | B2* | 1/2012 | Wei | G01S 7/4004 342/165 |
| 10,054,623 | B2* | 8/2018 | Estebe | H01Q 3/267 |
| 2005/0046608 | A1* | 3/2005 | Schantz | G01S 5/14 342/127 |
| 2007/0260378 | A1* | 11/2007 | Clodfelter | F41H 11/12 701/48 |
| 2009/0033546 | A1* | 2/2009 | Wei | G01S 7/40 342/165 |
| 2013/0238279 | A1* | 9/2013 | Schmier, II | G01S 7/40 702/150 |

* cited by examiner

AUTO TIER II

BACKGROUND

Field

This invention relates generally to a system and method for providing near-field radar cross-section (RCS) measurements of an aircraft and, more particularly, to a system and method for providing near-field RCS measurements of a large aircraft and configuring the near-field RCS measurements into a mosaic that provides an estimate of far-field RCS measurements of the aircraft.

Discussion

Various military aircraft, such as the B-2 bomber, are designed to provide stealth capabilities, i.e., the aircraft has a low radar cross-section (RCS) where most of the energy of a radar beam directed at the aircraft is either absorbed by the aircraft skin or reflected in a direction away from the radar unit. These aircraft must to go through rigorous testing procedures to ensure that the stealth capabilities of the aircraft meet the desired specifications before they are sold to the customer. These procedures require that the aircraft be flown under controlled conditions where in-flight far-field RCS measurements are provided to determine that the stealth requirements are met. However, such flight tests are very expensive, which further adds to the cost of an already expensive aircraft.

It is known in the art to perform near-field RCS measurements while the aircraft is stationary and positioned on the ground before performing the far-field RCS measurement tests to increase the likelihood that the aircraft will pass the far-field tests. Thus, if the aircraft does not meet the near-field RCS measurement requirements various remedies can be performed until it does so that the aircraft has a significantly improved chance of passing the far-field RCS measurement tests. Further, if the aircraft stealth requirements fail during the in flight far-field tests, and procedures are implemented to make corrections, it is also desirable to ensure that those corrections are satisfactory under near-field RCS measurements so as to further reduce cost. Also, the more often that in-flight far-field RCS measurement tests are required, the more likelihood that damage to the aircraft could occur, which also will need to be fixed.

In order to perform the near-field RCS measurements, one or more radar units are positioned relative to the aircraft as it is positioned at a testing location and radar reflections from the aircraft are processed. The RCS measurements need to be taken from various angles and directions, including from the top and bottom of the aircraft in order to perform the desired tests. However, currently there is no technique that allows such near-field RCS measurements to be taken in a fast and cost effective manner. In one known technique, a radar device is mounted to a genie lift that is raised and lowered to provide the near-field RCS measurements at different heights, and is also moved around the aircraft to take the RCS measurements at different locations. Such a technique is time consuming because the lift needs to be manually moved 360° around the aircraft and many measurements need to be taken at certain and minimal increments. It is also difficult to maneuver the lift so that measurements can be taken at every location on the aircraft.

SUMMARY

The present invention discloses and describes a system and method for providing an estimate of far-field radar cross-section (RCS) measurements of an aircraft while the aircraft is stationary. The system includes a plurality of automatic guided vehicles (AGV) each including a robot arm moveably mounted thereto and a radar unit selectively mounted to the robot arm and being interchangeable with a camera. Each AVG further includes an AGV positioning sub-system for positioning the AGV relative to the aircraft and positioning the robot arm on the AGV. Each AGV also includes an AGV controller for providing command and control signals to the AGV positioning sub-system, the robot arm, the radar unit and the camera so as to cause the radar unit to provide near-field RCS measurements or the camera to provide images of the aircraft at different elevations, angles and positions. The system further includes a real time signature diagnostic sub-system (SDS-RT) responsive to a stream of the near-field RCS measurement signals from the radar units and the images from the cameras in real time, and an SDS controller responsive to re-configured near-field RCS measurement signals or images from the SDS-RT and configuring and orienting the near-field RCS measurement signals and the images into the estimate of the far-field RCS measurements of the aircraft.

Additional features of the present invention will become apparent from the following description and appended claims, taken in conjunction with the accompanying drawings.

DETAILED DESCRIPTION OF THE EMBODIMENTS

The following discussion of the embodiments of the invention directed to system and method for providing near-field RCS measurements of an aircraft is merely exemplary in nature, and is in no way intended to limit the invention or its applications or uses. For example, the discussion herein talks about providing near-field RCS measurements of a B-2 bomber. However, as will be appreciated by those skilled in the art, the system of the invention will have application for taking near-field RCS measurements of other types of stealth aircraft, and other types of vehicles.

Figure 1:
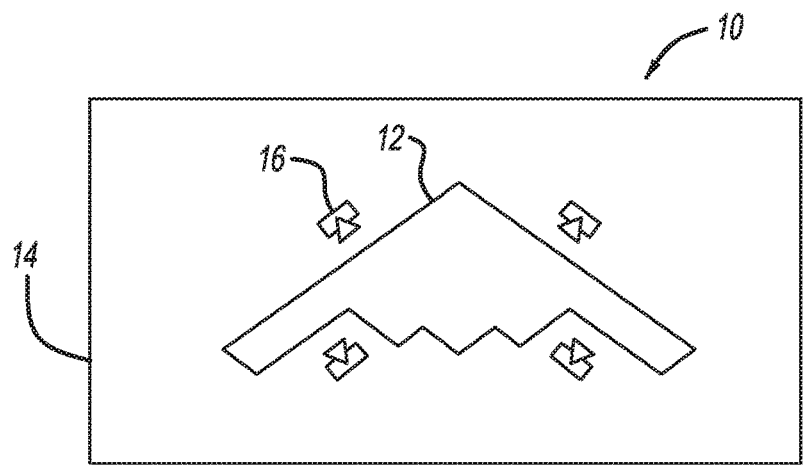
FIG. 1 is a top illustration of a B-2 bomber positioned at a near-field radar measurement facility.
Figure 2:
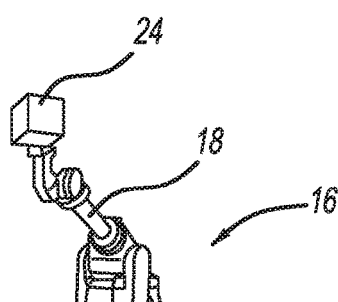
FIG. 2 is an isometric view of an automatic guided vehicle (AGV) including a robot arm having a measurement unit.

FIG. 1 is a top illustration of a near-field radar measurement facility 10 showing an aircraft 12, specifically a B-2 bomber, positioned within an RF shielded measurement bay 14. A number of AGVs 16, here four, are positioned around the aircraft 12. FIG. 2 is an isometric view of one of the AGVs 16 separated from the facility 10. Each AGV 16 includes a robot arm 18 slidably mounted on a moveable platform 20, where the platform 20 includes wheels 22 for positioning the AGV 16 at various locations in the bay 14. The robot arm 18 is controlled so that radar pulses scan across the aircraft 12. By providing four of the AGVs 16 including the robot arms 18 in this example, less movement of the robot arms 18 relative to the aircraft 12 to provide the near-field RCS measurements is required than what was previously necessary in the prior art.

The robot arm 18 includes a measurement unit 24 mounted to an end thereof, where the measurement unit 24 can either be a radar unit for providing radar measurements or a camera for providing optical images, as will be discussed in further detail below. The robot arm 18 can be any robot suitable for the purposes described herein that is able to move the unit 24 in all desirable degrees of freedom many of which are known in the art. The radar unit and the camera can be any radar unit or camera suitable for the purposes described herein, also many of which are known in the art. By providing both radar measurements and optical images of the aircraft 12, the data can be correlated where defects, such as nicks and scratches, in an outer surface of the aircraft 12 that are observed by the optical images can be analyzed to determine whether those defects are affecting the RCS measurements. The radar unit and the cameras are interchanged on the robot arm 18 because the RCS measurements and the optical images are taken at different distances and at different angles relative to the aircraft 12.

Figure 3:
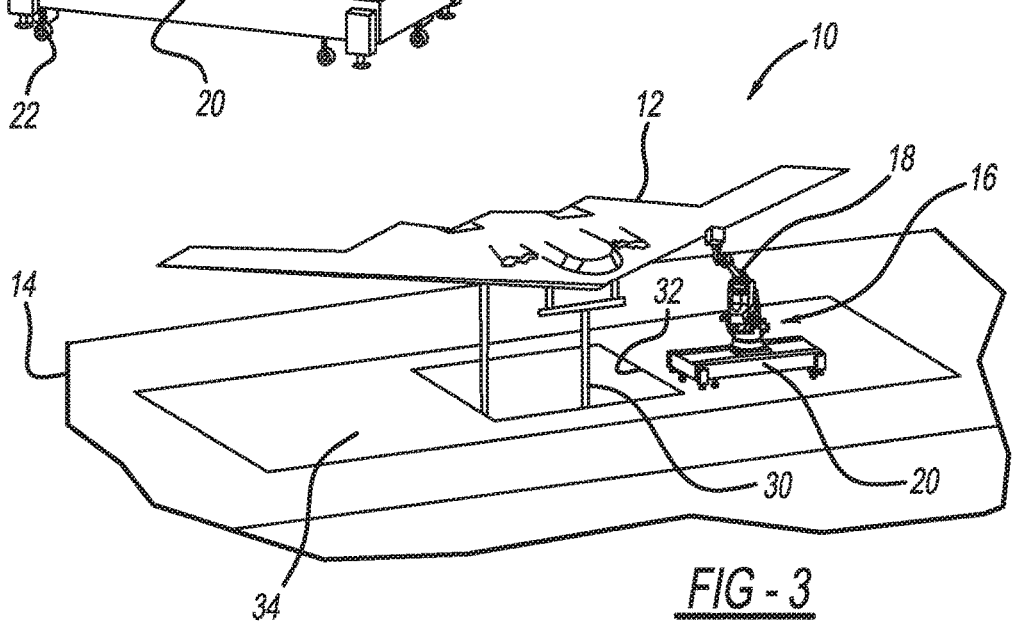
FIG. 3 is an isometric view of the B-2 bomber in a raised position at the near-field RCS measurement facility.

The facility 10 also includes the capability to raise the aircraft 12 so that the near-field RCS measurements can be more effectively taken from an underside of the aircraft 12 and provide far-field RCS measurement estimates of the aircraft 12 in its flight configuration. FIG. 3 is an isometric view of the facility 10 showing the aircraft 12 mounted to a jacking structure 30 that raises the aircraft 12 for this purpose. In this embodiment, the jacking structure 30 is raised through an opening 32 in the floor 34 of the bay 14. Once the aircraft 12 is elevated by the jacking structure 30, the aircraft gear (not shown) is raised and the payload doors (not shown) are closed so as to take the RCS measurements with the aircraft 12 in the flight configuration. The jacking structure 30 is able to raise the aircraft 12 high enough so that the RCS measurements and optical images can be taken at any suitable angle from underneath the aircraft 12.

Figure 4:
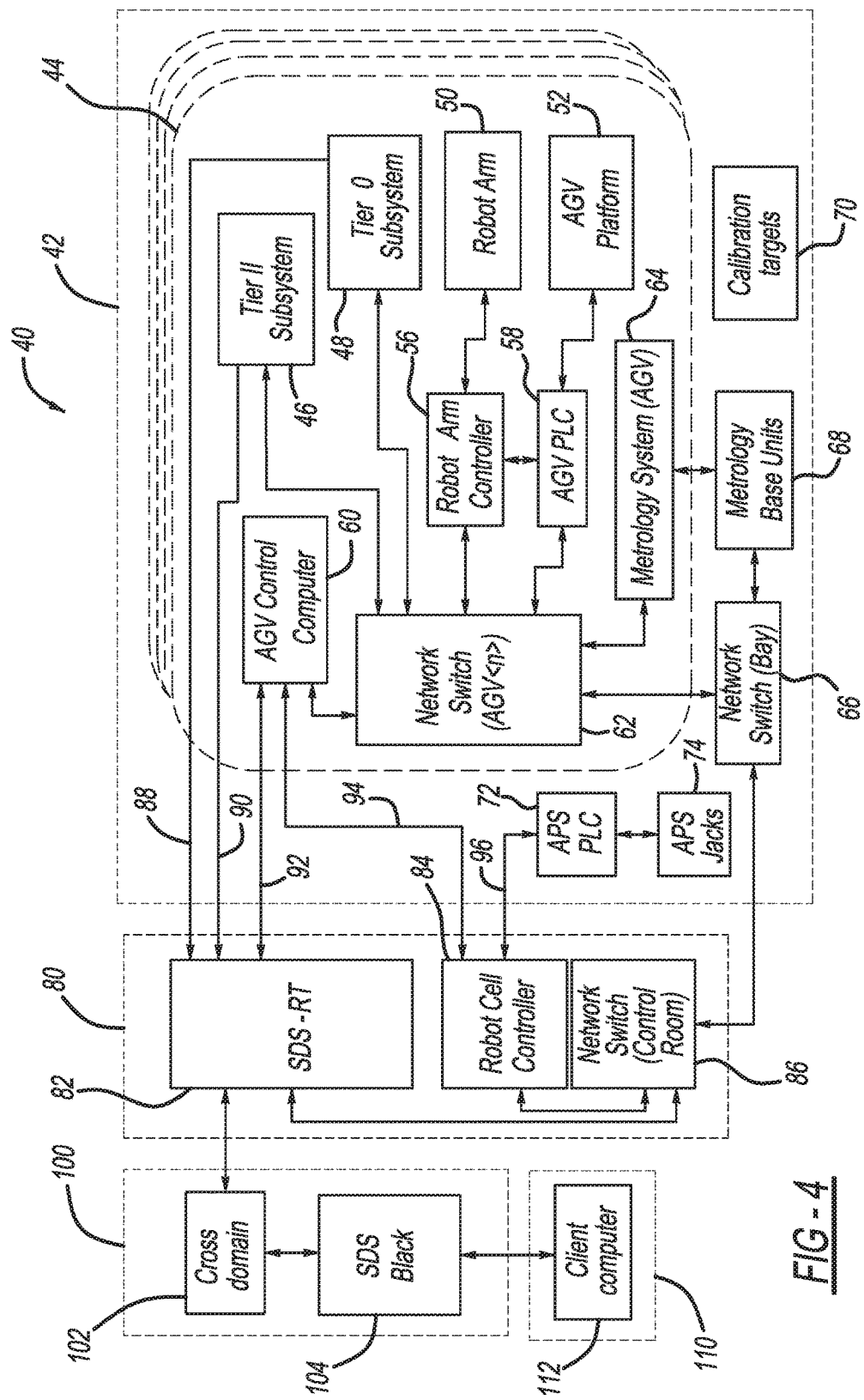
FIG. 4 is a block diagram of a measurement system for providing near-field RCS measurements of the B-2 bomber.

FIG. 4 is a block diagram of a measurement system 40 configured to provide the near-field RCS measurements and visual images at the facility 10 as discussed above. The system 40 includes a block 42 representing the measurement bay 14 and four blocks 44 each representing one of the AGVs 16. An AGV network switch 62 is provided on each AGV 44 and distributes signals between the various components on the AGV 44 and an AGV control computer 60 that controls the operation of the AGV 44. Each network switch 62 also distributes signals to and from a bay network switch 66 in the bay 42. The AGV control computer 60 is a top level computer on the AGV 44 that coordinates all of the signals from the various components, systems, etc. on the AGV 44. Those components and systems include a block 46 labeled tier II sub-system that represents the radar unit, a block 48 labeled tier 0 sub-system that represents the camera, a block 50 labeled robot arm that represents the robot arm 18, and a block 52 labeled AGV platform that represents the platform 20 and which controls the position of AGV 44. Each AGV 44 also includes a robot arm controller 56 that controls the robot arm 50, and an AGV programmable logic controller (PLC) 58 that controls the AGV platform 52. The robot arm controller 56 is specific to the type of robot arm that is employed, and is able to provide the necessary control signals to the robot arm 50 to properly move it in six-degrees of freedom.

The AGV control computer 60 receives signals from and provides signals through the switch 62 to a metrology system 64 on the AGV 44, where the metrology system 64 tells the AGV control computer 60 the location of all of the various hardware and other components that are within the measurement bay 42 and the relationship of the AGV 44 to the aircraft 12. The metrology system 64 provides signals to and receives signals from a metrology base unit 68 located in the bay 42 that includes various sensors and devices so that it can provide suitable signals identifying the location of the various components in the measurement bay 42.

A series of calibration targets 70 are positioned in the measurement bay 42 to allow the tier II sub-system 46 to transmit radar signals at the targets 70 at the particular frequency so as to calibrate the radar unit for that frequency. The calibration targets 70 will also include suitable targets for the camera so that the tier zero sub-system 48 can also be calibrated.

An aircraft positioning system (APS) PLC 72 and an APS jack 74, representing the jacking structure 30, are provided within the measurement bay 42. The APS jack 74 is controlled by the APS PLC 72 to lift the aircraft 12 on the jack 74 at the appropriate time and in the appropriate orientation so that the aircraft 12 can be lifted to raise the gear so that the aircraft 12 is oriented as it would be in flight.

The system 40 also includes a control room 80 in the facility 10 in which is provided a real time signature diagnostic system (SDS-RT) controller 82, a robot cell controller 84 and a control room network switch 86. The SDS-RT controller 82 receives measurement signals from all of the sub-systems 46 and 48 on lines 88 and 90, respectively, and provides control and status signals to and receives control and status signals from all of the AGV control computers 60 on line 92. The robot cell controller 84 provides control and status signals to and receives control and status signals from all of the AGV control computers 60 on line 94 and the APS PLC 72 on line 96. The SDS-RT controller 82 provides signals to the robot cell controller 84 through the network switch 86 so that the robot cell controller 84 can send instructions to the robot arm 50 through the robot arm controller 56 for each of the separate AGV 44 so that the measurements taken by each of the separate radar units on the robot arm 50 are coordinated relative to each other. In other words, the SDS-RT controller 82 tells the robot cell controller 84 how the measurements need to be taken for the aircraft 12 to obtain the desired near-field RCS measurements. More particularly, the robot cell controller 84 will instruct the robot arm 50 in each of the AGVs 44 to provide various information such as the distance of the radar units from the aircraft 12, the location of a center of the aircraft 12, how many degrees of azimuth needs to be collected, elevation angle of the radar unit, etc. Generally the robot arm 50 moves the radar unit in an arc so that it is always pointed at the same location on the aircraft 12. In one specific embodiment, the robot arm 50 moves the radar unit in an arc over 90° as it is taking the measurements of a particular location on the aircraft 12 to provide the full RCS measurements desired.

The robot cell controller 84 also receives signals from the metrology system 64 through the network bay switch 66 and the control room network switch 86 so that it knows where each component in the measurement bay 42 is located, and provides that information to the SDS-RT controller 82 and the AGV control computers 60 to be appropriately distributed as need.

The system 40 also includes a server room 100 in the facility 10 that has a cross domain block 102 in communication with the SDS-RT controller 82, and an SDS black box 104. The cross domain block 102 allows the SDS black box 104 and the SDS-RT controller 82 to communicate between two different levels of classified data. The SDS black box 104 receives the many RCS measurement signals and the many camera images at different points in time, and configures those measurements or images so that a complete image or RCS measurement of the aircraft 12 can be obtained. The algorithms employed in the SDS black box 104 are able to use the individual RCS measurements and combine them into a mosaic reconstruction of the entire aircraft 12, which can be used to provide an estimation of the far-field RCS measurements while the aircraft 12 is stationary.

The system 40 is capable of automatically correlating radar data at various measurement locations with camera data at those locations so that the significance of any damage to the aircraft 12, such as nicks and other defects in the aircraft skin, can be determined as to how detrimental they are to the RCS measurements. Thus, it can be determined based on the near-field RCS measurements whether such scratches and other defects actually need to be fixed to ensure that the aircraft 12 meets the stealth requirements. In one measurement process, the camera images are taken prior to the radar measurements so that the location, orientation, etc., of the aircraft 12 is first obtained.

The system 40 also includes a data analysis room 110 located in the facility 10 including a client computer 112 that is in communication with the SDS black box 104 and is any suitable computer running a web browser.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for providing an estimate of far-field radar cross-section (RCS) measurements of an object, said system comprising:
   at least one automatic guided vehicle (AGV) including a robot arm moveably mounted thereto and a radar unit selectively mounted to the robot arm, said at least one AGV further including an AGV positioning sub-system for positioning the AGV relative to the object and positioning the robot arm on the AGV, said at least one AGV also including an AGV controller for providing command and control signals to the AGV positioning sub-system, the robot arm and the radar unit so as to cause the radar unit to provide near-field RCS measurements of the object at different elevations, angles and positions;
   a real time signature diagnostic sub-system (SDS-RT) responsive to a stream of the near-field RCS measurement signals from the radar unit in real time; and
   an SDS controller responsive to near-field RCS measurement signals from the SDS-RT, said SDS controller configuring and orienting the near-field RCS measurement signals into the estimate of the far-field RCS measurements of the object.

2. The system according to claim 1 wherein the SDS controller configures the near-field RCS measurement signals into a mosaic of the measurement signals.

3. The system according to claim 1 wherein the at least one AGV further includes an optical camera that is selectively interchangeable with the radar unit and being operable to take optical images of the object and provide the images to the SDS-RT.

4. The system according to claim 3 wherein the SDS-RT provides the optical images to the SDS controller and the SDS controller correlates the optical images with the near-field RCS measurement signals so as to determine whether defects in the object affect the radar cross-section of the object.

5. The system according to claim 1 wherein the at least one AGV is a plurality of AGVs where each AGV provides the near-field RCS measurement signals to the SDS-RT.

6. The system according to claim 5 further comprising a robot cell controller that controls the robot arm in each of the plurality of AGVs.

7. The system according to claim 6 further comprising a metrology base units controller separate from the plurality of AGVs and providing distance and orientation signals to the robot cell controller.

8. The system according to claim 5 wherein the plurality of AVGs is four AGVs.

9. The system according to claim 1 further comprising an object jack for raising the object so as to allow the radar unit to take RCS measurement signals of an underside of the object.

10. The system according to claim 1 further comprising a plurality of a calibration targets for calibrating the radar unit.

11. The system according to claim 1 wherein the object is an aircraft.

12. The system according to claim 11 wherein the aircraft is a B-2 bomber.

13. A system for providing an estimate of far-field radar cross-section (RCS) measurements of an aircraft, said system comprising:
   a plurality of automatic guided vehicle (AGV) each including a robot arm moveably mounted thereto and a radar unit selectively mounted to the robot arm and being interchangeable with a camera, each AGV further including an AGV positioning sub-system for positioning the AGV relative to the aircraft and positioning the robot arm on the AGV, each AGV also including an AGV controller for providing command and control signals to the AGV positioning sub-system, the robot arm, the radar unit and the camera so as to cause the radar unit to provide near-field RCS measurements and the camera to provide images of the aircraft at different elevations, angles and positions;
   a real time signature diagnostic sub-system (SDS-RT) responsive to a stream of the near-field RCS measurement signals from the radar unit and the images from the camera in real time; and
   an SDS controller responsive to near-field RCS measurement signals and images from the SDS-RT and configuring and orienting the near-field RCS measurement signals into a mosaic of the measurement signals to provide the estimate of the far-field RCS measurements of the aircraft.

14. The system according to claim 13 wherein the SDS controller correlates the optical images with the near-field RCS measurement signals so as to determine whether defects in the object affect the radar cross-section of the object.

15. The system according to claim 13 further comprising a robot cell controller that controls the robot arm in each of the plurality of AGVs.

16. The system according to claim 15 further comprising a metrology base units controller separate from the plurality of AGVs and providing distance and orientation signals to the robot cell controller.

17. The system according to claim 13 wherein the plurality of AVGs is four AGVs.

18. The system according to claim 13 further comprising an object jack for raising the object so as to allow the radar unit to take RCS measurement signals of an underside of the aircraft.

19. The system according to claim 13 further comprising a plurality of a calibration targets for calibrating the radar unit.

20. The system according to claim 13 wherein the aircraft is a B-2 bomber.

* * * * *